(12) United States Patent
Ward et al.

(10) Patent No.: US 10,089,965 B1
(45) Date of Patent: Oct. 2, 2018

(54) USER-CONTROLLED MOVEMENT OF GRAPHICAL OBJECTS

(71) Applicant: SIMBULUS, INC., Boulder, CO (US)

(72) Inventors: Jeffrey C. Ward, Arvada, CO (US); Roger B. Milne, Boulder, CO (US); Thomas E. Fischaber, Boulder, CO (US); Sean A. Kelly, Boulder, CO (US); Krista M. Marks, Boulder, CO (US)

(73) Assignee: Simbulus, Inc., Boulder, CO (US)

( * ) Notice: Subject to any disclaimer, the term of this patent is extended or adjusted under 35 U.S.C. 154(b) by 38 days.

(21) Appl. No.: 14/855,077

(22) Filed: Sep. 15, 2015

(51) Int. Cl.
*G06F 3/0484* (2013.01)
*G09G 5/37* (2006.01)
*G06T 3/60* (2006.01)

(52) U.S. Cl.
CPC .......... *G09G 5/37* (2013.01); *G06F 3/04845* (2013.01); *G06T 3/60* (2013.01); *G09G 2340/0492* (2013.01); *G09G 2354/00* (2013.01)

(58) Field of Classification Search
None
See application file for complete search history.

(56) References Cited

U.S. PATENT DOCUMENTS

| 8,493,384 B1 * | 7/2013 | Reisman | G06F 3/0425 345/419 |
| 2012/0162117 A1 * | 6/2012 | Wilson | G06F 17/5009 345/173 |
| 2012/0322556 A1 * | 12/2012 | Rogers | A63F 13/10 463/37 |

OTHER PUBLICATIONS

Marcelo Kallmann, "Shortest Paths with Arbitrary Clearance from Navigation Meshes," Eurographics/ACM SIGGRAPH Symposium on Computer Animation (2010), pp. 159-168, 233.*

* cited by examiner

*Primary Examiner* — Edward Martello
(74) *Attorney, Agent, or Firm* — Crawford Maunu PLLC

(57) ABSTRACT

Disclosed are methods and systems for moving and manipulating graphical objects on a device that may include one or more pointing device, such as a mouse, a touchpad, or a touch screen, some of which may be multi-touch enabled. In some embodiments, a method may include, concurrent with and in response to user input from a pointing device: moving a first graphical object, determining a plurality of alternative target orientations for that first graphical object, selecting one of the target orientations, and gradually changing certain display characteristics of the first object based on characteristics of the selected target orientation.

26 Claims, 8 Drawing Sheets

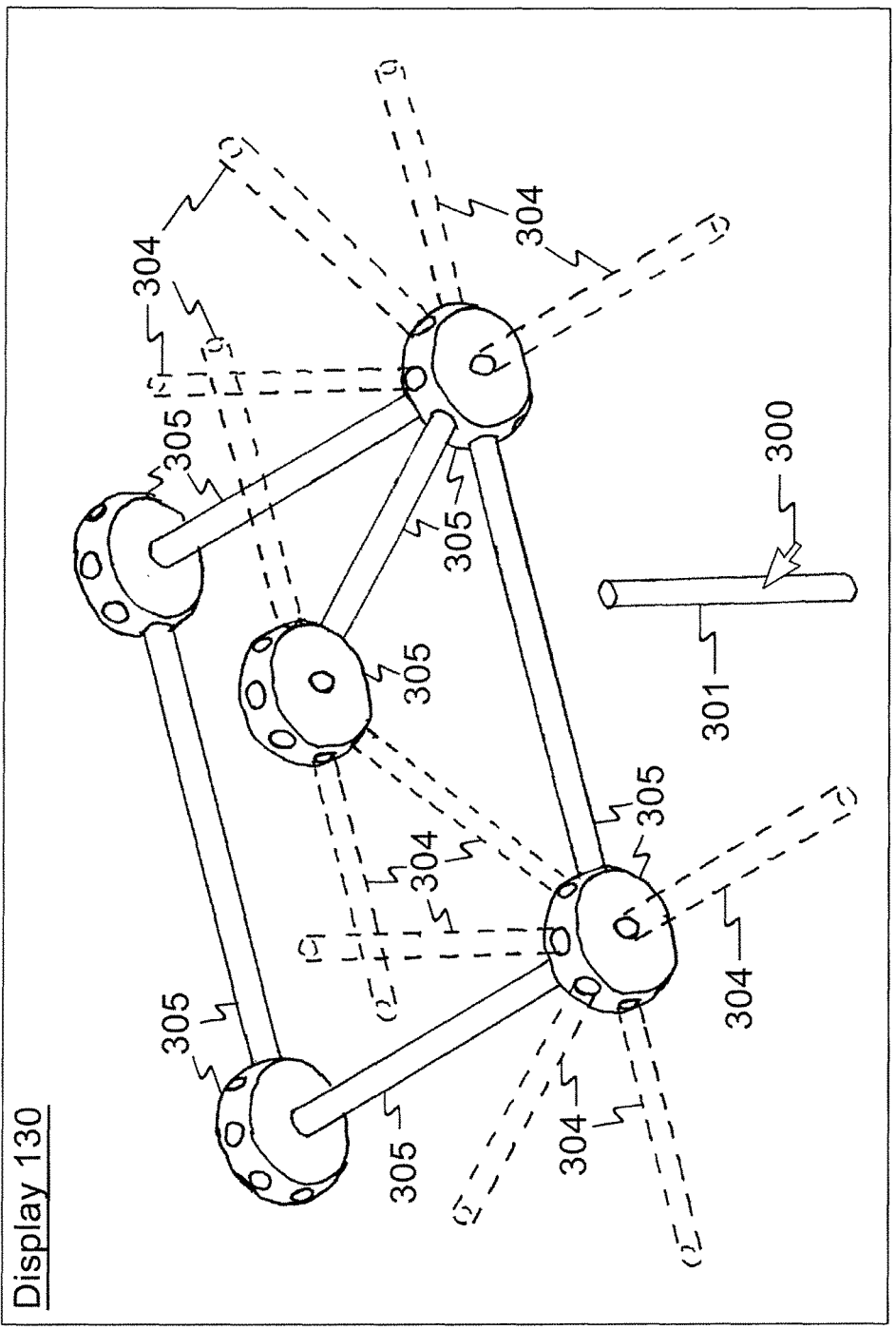

USER-CONTROLLED MOVEMENT OF GRAPHICAL OBJECTS

TECHNICAL FIELD

The disclosure describes the use and production of graphical user interfaces (GUIs) that are applicable to the field of 2D or 3D digital modeling. The described approaches relate to methods for providing intuitive movement of graphical objects whether using single or multi-point control inputs, and for a range of user skill levels.

BACKGROUND

The proliferation of devices and their various capabilities for single-point and multi-point pointing devices—including touchscreens, computer mice, touchpads, and even infrared or computer vision pointing devices—has led to a need for software to provide GUIs that are flexible and aware of differing hardware capabilities as well as user expectation and experience.

Graphical object manipulation by multiple control points is well known in the art. One such manipulation is a multi-touch gesture. It is also well known that the number of control points used to manipulate graphical objects may over- or under-constrain the possible movement of the graphical object, depending on the constraints of the movement defined by the software. For example, many multi-touch photo galleries allow images to be re-positioned, but not rotated or resized. Others may allow position, scale, and rotation to be adjusted, or adjusted within constraints, such as constraining rotation to 90-degree increments. In 3D applications, the graphical objects on the screen are 2D depictions of objects in the 3D space in the application. There are more degrees of freedom in 3D, as well as the problem of translating 2D screen coordinates of user manipulations to the underlying 3D objects. Because of this, intuitive GUIs are difficult to create in the 3D modeling space, while the growth and consumer adoption of 3D applications (such as modeling for 3D printing, augmented reality, etc.) has created a necessity for more user-friendly, intuitive 3D modeling GUIs and applications.

Multi-touch gestures allow users to manipulate graphical objects in intuitive ways, removing the necessity of separate controls for each degree of movement. For example, before multi-touch pointing devices were prevalent, software typically displayed separate controls for scaling, rotating, and translating graphical objects in 2D, and even more controls for objects in 3D. Multi-touch devices provide intuitive mechanisms for many such operations, with the user applying one control point, secondary control points, manipulating the control points relative to one another, and releasing control points, with the return to zero control points typically indicating the end of the user's interaction sequence. Today, interfaces often must be usable on both single and multi-touch devices, and usable by users of varying skill and experience in interacting with multi-touch devices. Users also have an expectation of simplicity and consistency across devices, while available screen space and user input mechanisms vary widely.

When software allows graphical objects to be manipulated, it is well known in the art that there are frequently one or more desired final orientations (including but not limited to position, scale, and rotation) of a graphical object. For example, when manipulating an application icon on a home screen or desktop, a grid layout defines a plurality of possible target orientations of the icon. When manipulating sectors of a circle that form a pie chart, aligning the centroid and edge of the sector with those already in place defines a plurality target orientations of the sector. In some cases, the existence of other graphical objects define target orientations for the graphical object being manipulated, as it is common to align graphical objects with one another. While this description cites specific examples of applications and their target orientations for clarity, it is not intended to limit the scope of the invention.

SUMMARY

This disclosure describes, in part, methods and systems for user movement and manipulation of graphical objects on a device with a mouse, touchpad, touch screen, or other like component. These methods and systems may be configured in various ways to allow users to more easily manipulate graphical objects, or collections of graphical objects, and so that the users may more quickly and with less interactions assemble graphical objects into the orientations, placements, and patterns that are intended by the user. In addition, these methods and systems may be configured in ways that use physical models to provide users with interactive behaviors that seem intuitive and readily predictable. As a result, interaction times may be reduced, user frustrations may be eliminated, user training reduced, and costs associated with the use of such systems in professional or educational settings may be reduced.

In one embodiment, a method of displaying objects includes displaying movement of a first object on a display device in response to user input from a pointing device to a processor that outputs to the display device, display characteristics of the first object; determining by the processor, concurrent with the movement of the first object, a plurality of alternative target orientations of the first object; selecting a first target orientation from the plurality of alternative target orientations by the processor; determining supplemental display characteristics of the first object by the processor based on the first target orientation and concurrent with the movement of the first object; and gradually applying the supplemental display characteristics by the processor to the displayed movement on the display device as the first object is moved.

In another embodiment, a system is provided for augmenting display of graphical objects. The system includes a processor, a memory coupled to the processor, and a display device coupled to the processor. The memory is configured with instructions that when executed by the processor cause the processor to perform operations including: displaying movement of a first object on a display device in response to user input from a pointing device to a processor that outputs to the display device, display characteristics of the first object; determining by the processor, concurrent with the movement of the first object, a plurality of alternative target orientations of the first object; selecting a first target orientation from the plurality of alternative target orientations by the processor; determining supplemental display characteristics of the first object by the processor based on the first target orientation and concurrent with the movement of the first object; and gradually applying the supplemental display characteristics by the processor to the displayed movement on the display device as the first object is moved.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The foregoing aspects and many of the attendant advantages of this invention will become more readily appreciated with reference to the Detailed Description in conjunction with the accompanying drawings, wherein:

FIG. 3 illustrates a 3D spoke-and-hub modeling application, showing a sampling of target orientations for the manipulation of a spoke piece;

DETAILED DESCRIPTION

Figure 1:
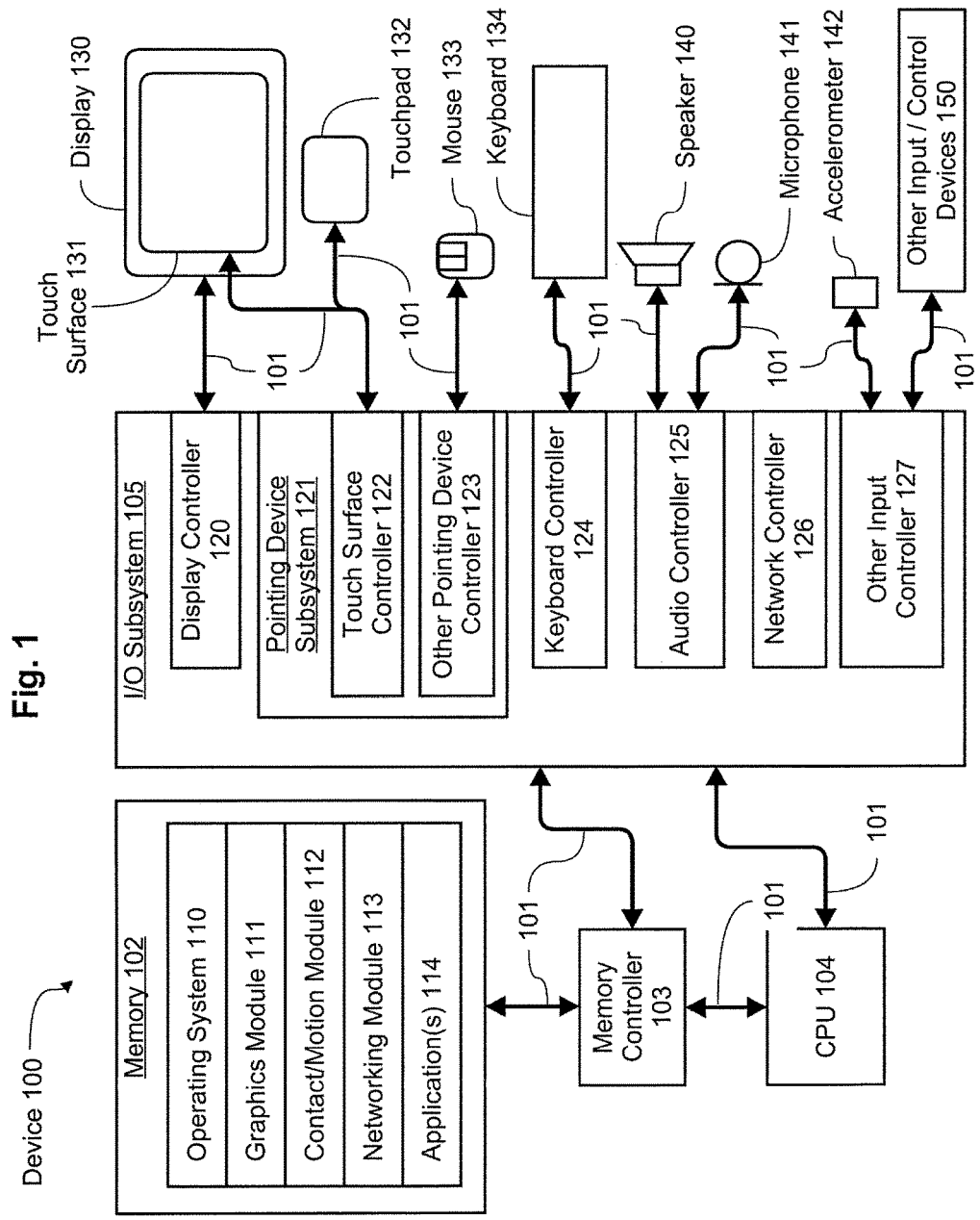
FIG. 1 is a block diagram of an electronic device.

In the description and drawings, like reference numerals are used to refer to like elements throughout. For purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing embodiments of the invention.

As used in this description, the term "component" is intended to refer to a computer-related entity, either hardware or a combination of hardware and software. One or more components may reside within a process and/or thread of execution and a component may be localized on one computer and/or distributed between two or more computers. The term "controller" may be used to refer to certain components in the description of FIG. 1 that follows.

FIG. 1 illustrates an electronic device. The device 100 includes a memory 102, a memory controller 103, one or more processors (CPU's) 104, an input/output (I/O) subsystem 105, a display 130 (alternatively referred to as a "display device"), a speaker 140, a microphone 141, an accelerometer 142, a keyboard 134, a mouse 133, and other input/control devices 150. These components communicate over one or more communication buses, signal lines, or wireless communication systems 101 using one or more communication protocols, including communication systems and communication protocols not yet developed as of the filing date of this document. The device 100 can be any electronic device, including but not limited to a desktop computer, handheld computer, a tablet computer, a mobile phone, a laptop computer, a personal digital assistant (PDA), or the like, including a combination of two or more of these items. It should be appreciated that the device 100 is only one example of an electronic device 100, and that the device 100 may have more or fewer components than shown, or a different configuration of components. The various components shown in FIG. 1 may be implemented in hardware or a combination of hardware and software, including one or more application specific integrated circuits, general purpose integrated circuits, general purpose processing units, signal processors, and/or programmable processing unit.

The memory 102 may include volatile and/or non-volatile memory, may include digital and/or analog storage devices, and may include random access memory devices, flash memory devices, magnetic storage devices, other solid-state memory devices, and/or other physical storage devices. In some implementations, the memory 102 may further include storage remotely located from the one or more processors 104, for instance network attached storage accessed via the network controller 126 over a communications network (not shown) such as the Internet, intranet(s), Local Area Networks (LANs), Wide Local Area Networks (WLANs), Storage Area Networks (SANs) and the like, or any suitable combination thereof. Access to the memory 102 by other components of the device 100, such as the one or more processors 104 and the peripherals interface 108, may be controlled by the memory controller 103.

The I/O subsystem 105 couples input and output controllers of the device to the one or more processors 104 and the memory controller 103. The one or more processors 104 run various software programs and/or sets of instructions stored in the memory 102 to perform various functions for the device 100 and to process data.

The I/O subsystem 105 provides the interface between the one or more processors 104 and memory controller 103 on the device 100, and the input and output controllers, including a display controller 120, a pointing device subsystem 121, a keyboard controller 124, a network controller 126, an audio controller 125, and another input controller 127. The other input controller 127 provides an interface between the I/O subsystem 105 and input devices such as the accelerometer 142 and other input/control devices 150 which may include physical buttons, dials, sliders, sensors, and/or GPS devices.

The audio controller 125, the speaker 140, and the microphone 141 provide an audio interface between a user and the device 100. The audio controller 125 receives audio data via the I/O subsystem 105, converts the audio data to an electrical signal, and transmits the electrical signal to the speaker 140. The speaker converts the electrical signal to sound waves. The audio controller 125 also receives electrical signals converted by the microphone 141 from sound waves. The audio controller 125 converts the electrical signal to audio data and transmits the audio data to other components for processing. Audio data may be retrieved from and/or transmitted to the memory 102 and modules and applications therein.

The display 130 provides visual output to the user via the display controller 120. The visual output may include text, graphics, video, and any combination thereof. Some or all of the visual output may correspond to graphical objects, further details of which are described below. The display 130 may use LCD (liquid crystal display) technology, although other display technologies may be used in other implementations.

The device 100 may include a touchscreen, comprising a display 130 and a touch surface 131. As such the touchscreen may provide both an output interface and an input interface between the device and a user. Those of ordinary skill in the art will understand that descriptions of user interactions with the device whether described in terms of interactions with the touchscreen or in terms of interaction with the touch surface 131 are equivalent and interchangeable.

In some implementations, the keyboard controller 124 provides user input from a physical keyboard 134. The keyboard 134, which may be a full keyboard or a numpad or similar device, receives input when a user physically contacts or depresses a keyboard key. In some implementations, a software keyboard (i.e. soft keyboard or virtual keyboard) is implemented as a graphical object displayed on the display 130, where user key-press interaction is facilitated via the touchscreen.

In some implementations, the software components include an operating system (or set of instructions) 110, a contact/motion module (or set of instructions) 112, a graphics module (or set of instructions) 111, a networking module (or set of instructions) 113, and one or more applications (or set of instructions) 114. The software components 110, 111, 112, 113, and 114 are executable by the processor(s) 104 for interfacing with the components in the I/O subsystem 105.

The operating system 110 (e.g., ANDROID, IOS, LINUX, OS X, UNIX, VxWorks, WINDOWS) includes various software components and/or drivers for controlling and managing general system tasks (e.g., memory management, subsystem control, resource sharing, application scheduling, power management, etc.) facilitates communication between various hardware and software components, and facilitates communication and interaction between the user and various hardware and software components, including communication and interaction between the use and the application(s) 114.

The networking module 113 facilitates communication with other devices connected directly or indirectly via the network controller 126. The network communication may use any of a plurality of communications standards, protocols and technologies, including but not limited to Ethernet (e.g. IEEE 802.3), transmission control protocol/internet protocol (TCP/IP), Wireless Fidelity (Wi-Fi) (e.g., IEEE 802.11n), Universal Serial Bus (USB), Global System for Mobile Communications (GSM), code division multiple access (CDMA), time division multiple access (TDMA), Bluetooth, a protocol for email, instant messaging, or any other suitable communication protocol, including communication protocols not yet developed as of the filing date of this document.

The contact/motion module 112 detects contact with the touch surface 131, in conjunction with the touch surface controller 122. The contact/motion module 112 includes various software components for performing various operations related to detection of contact with the touch surface 131, such as determining if contact has occurred, determining if there is movement of the contact and tracking the movement across the touchscreen, and determining if the contact has been broken (i.e., if the contact has ceased). Determining movement of the point of contact may include determining speed (magnitude), velocity (magnitude and direction), and/or an acceleration (including magnitude and/or direction) of the point of contact. In some implementations, the contact/motion module 112 and the touch surface controller 122 also detects contact on a touchpad 132.

The graphics module 111 includes various known software components for rendering and displaying graphics on the display 130. Note that the term "graphics" (or "graphical object") includes any object that can be displayed to a user, including without limitation text, web pages, icons (such as user-interface objects), digital images, videos, animations and the like.

The one or more applications 114 can include any applications installed on the device 100, including without limitation, a browser, email, learning applications, games, modeling applications, design applications, word processing, widgets, voice recognition, voice replication, location determination capability (such as that provided by the global positioning system (GPS)), multimedia players, etc.

In some implementations, the pointing device subsystem 121 comprises a touch surface controller 122, and an other pointing device controller 123. The other pointing device controller 123 receives user input from pointing devices such as the mouse 133 or other pointing devices such as a trackball, joystick, or similar input device. The pointing device subsystem 121 and I/O subsystem 105 facilitate communication of user input via the pointing devices to the software modules. Those skilled in the art will appreciate that various other interfaces and sensors can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The touch surface controller 122 accepts input from the user based on haptic and/or tactile contact with any of the touch input devices (the touch surface 131 of the touchscreen and the touchpad 132). The touch surface 131, touchpad 132, and the touch surface controller 122 (along with any associated modules and/or sets of instructions in the memory 102) detects contact (and any movement or break of the contact) on the touch input devices and converts the detected contact into interaction with graphics objects that are displayed on the display 130. The touch surface 131, touchpad 132, and/or touch surface controller 122 may detect contact and any movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 131. The user may make contact with the touch surface 131 or the touchpad 132 using any suitable object or appendage, such as a stylus, finger, and so forth. In an exemplary implementation, a point of contact between a touch input device and the user corresponds to one or more touch-points of the user, using any suitable object or appendage, and such user interactions are known in the art as "single-touch gestures" or "multi-touch gestures", depending on the number of touch-points used in the interaction.

In some implementations, a voice recognition apparatus, which may be implemented on the device 100, or as a service accessible via the network controller 126, is capable of translating user voice commands 503 captured as audio data via the device's audio controller 125 into corresponding textual data. The textual data is received by the application 114 or other software modules for processing the voice commands.

The term "pointing device" is used broadly in this invention disclosure to include any input interface that allows spatial input to the electronic device 100 for which input points are correlated to the graphical display of the electronic device 100. FIG. 1 illustrates a form of such an electronic device currently common in the art in which the graphical display is overlaid with a touch-sensitive surface so as to form touchscreen that combines graphical display with multi-point capable pointing device. Those of ordinary skill in the art will understand that display and pointing device are also often decoupled and may take on several forms, and that pointing devices provide a range of ways for the user to interact with the device. Single point pointing devices include a mouse and trackball. Multi-point-capable pointing devices include a touchscreen and touchpad. It should be appreciated that a multi-point-capable pointing device may still often be used in a manner that provides only a single control point (e.g., a single-touch gesture on a touchscreen). While for the sake of simplicity, we may often describe the invention in terms of an exemplary implementation in an electronic device with a multi-point-capable touchscreen, those of ordinary skill in the art will understand that the invention is equally applicable to other pointing devices.

The term "graphical object" is used broadly in this invention description to include any graphical object that may be displayed to user on an output screen, including but not limited to, desktop windows, photo gallery images, desktop publishing images, digital manipulatives and models, clip art, icons and user interface elements. Such use of this term should be easily understood by those knowledgeable in the art.

The "display characteristics" of a graphical object refer to those properties that define the how the graphical object is rendered onto the display. The display characteristics of graphical objects may include "orientation" display characteristics, which include the spatial transformations (e.g., position, rotation, scale, skew), whether in 2D or 3D, that cause the graphical object to be displayed in a specific manner on the display. These orientation display characteristics may also be expressed as the "orientation" of the graphical object and may include the projection of modeled objects from a space of two or more dimensions onto a two dimensional space for rendering to the display 130, as will be understood by those knowledgeable in the art. Other display characteristics may include colorization, lighting effects, transparency effects, textures, and texture mappings.

The process of "user manipulation" of a graphical object is a process referred to broadly in this description including any interaction of the user with the device's various I/O capabilities (e.g. touchscreen, mouse, other pointing device, keyboard, accelerometer input) to affect the display characteristics of a graphical object.

"Movement" of a graphical object refers to a change in display characteristics of a graphical object. The movement of a graphical object may be in response to a user manipulation of the graphical object (for example, as the user uses a pointing device to "drag" an object across the display, the displayed position of the object changes). The movement may also be independent of user interaction (for example, a graphical object may be rotated or animated by the application code as determined algorithmically). It should be appreciated that the overall movement of a graphical object may result from a combination of simultaneous factors, including user manipulation and algorithmically determined changes to supplemental display characters.

The term "augmentation" of user manipulation of a graphical object is used to describe the process of applying supplemental, algorithmically determined display characteristics simultaneously with user manipulations of graphical objects. In some implementations, the supplemental display characteristics may be applied gradually over the course of the user interaction. In some implementations, the supplemental display characteristics may be applied for some finite time after the user interaction is complete.

In some implementations, the augmentation of user manipulation is restricted in scenarios in which supplemental display characteristics would appear to conflict with the user manipulation. To avoid an appearance of conflicting with user manipulation, supplemental display characteristics do not alter transformations of the orientation that are constrained by the user manipulation. For example, if the user manipulation is translating the graphical object, the augmentation may rotate or scale the graphical object (or change supplemental display characteristics that are unrelated to the orientation of the object, such as color) without appearing to conflict with the user manipulation. In some implementations, the augmentation may adjust the user-constrained transformations of the orientation to a degree that does not appear to conflict with the user manipulation.

In an exemplary implementation, augmentation of user manipulation of a graphical object provides transformations to a graphical object's orientation that cannot be derived from the user input, and are normally only accessible using higher degrees of input (such as a multi-touch gestures) or multiple inputs (e.g., via graphical controls or keyboard input). Such augmentation may be applied even when the user employs a relatively simple input (e.g., a single-point interaction). For example, the augmentation may comprise a change in rotation to the graphical object while the user is dragging (i.e. a change in position) the graphical object via the mouse cursor. One skilled in the art will appreciate that the single-point mouse input does not provide enough information to define both the rotation and translation movement of the graphical object.

A "target orientation" is an orientation of a graphical object that the graphical object may be made to assume. In an exemplary implementation, a set of one or more target orientations consists of those orientations of the graphical object which are common or intuitive given the goal of the user when manipulating the graphical object. In a digital modeling implementations, the user often manipulates objects that fit together in specific ways within some model-specific constraints. In another implementation, graphical objects may be arranged in a grid or other pattern, the pattern defining a set of target orientations for a user manipulation of some of the graphical objects. To illustrate, FIGS. 2A-2D, 3, and 4 each depict a set of intuitive target orientations 204 for the first graphical object 200. The disclosed approaches leverage such target orientations to provide a GUI and methods of intuitive manipulation of graphical objects that are intuitive, consistent, and accessible across a variety of devices for a variety of users and user interaction scenarios.

In one implementation shown in FIG. 2A-D, the user is interacting with a 2D fraction circle modeling application. When the user initiates an interaction with the first graphical object 200, such as by touching a fraction circle model piece on a touch screen, the set of target orientations 204 are determined with respect to the physical properties of the objects being modeled, that is, their dimensions and the way the pieces fit together in order to build a more complete model. The set of target orientations in FIG. 2A-D are determined as those which would align the edges of the first graphical object 200 with edges of other fraction circle pieces 205 on the screen, without overlapping existing pieces. In other implementations, physical properties used in determining a set of target orientations might include magnetism, polarity, or joint compatibility (as illustrated in the spoke and hub model in FIG. 3 and FIG. 4). The set of target orientations may be determined based on properties of the object being manipulated along with properties of other displayed objects. The properties may be stored in the memory 102 and accessed by the processor(s) 104. Processor(s) 104 may determine the set of target orientations, calculate and apply the augmentations to this properties and, in general, perform the various algorithmic, computational, and flow control operations shown in the Drawings and described in the Detailed Description.

The process of selecting a first target orientation may be embodied in an algorithm executed by the processor(s) 104. In some implementations, the algorithm determines the target orientation nearest to the graphical object being manipulated ("first graphical object"). It should be appreciated that there are many ways to determine the nearest target orientation; a typical approach is outlined in the following steps:

1. Compute the bounding box on the display of the first graphical object.
2. Compute the bounding box of the first graphical object as it would be displayed at each target orientation.
3. Each target orientation's bounding box differs from the first graphical object's bounding box by a difference in position values x and y, and size values width and height.
4. The target orientation that is "nearest" to the first graphical object has a minimal error (i.e. sum of squared differences in the above values), and is selected as the first target orientation.

In some implementations, the process of selecting one of the target orientations is repeated throughout the user manipulation of the first graphical object, and may result in selecting different target orientations under different conditions. It should be appreciated that the selecting a target orientation could take into account any number of display characteristics and object properties (such as object centroids, groups of other graphical objects, physical properties such as magnetism, and hysteresis of past selected target orientations) as well as additional user inputs via any of the device's I/O capabilities.

It should be appreciated that two target orientations of a graphical object can be compared. In one implementation, the weighted sum of squares of the difference in numeric components of the orientation (such as x/y/z position, rotation angles, and scale or size in one or more dimensions) provides a numeric basis for the difference between two orientations. A first target orientation is more similar to the orientation of the first graphical object than is a second target orientation to the orientation of the first graphical object if the numeric value computed for the first target orientation and the first graphical object is less than the numeric value computed for the second target orientation and the first graphical object. Hence, it should be appreciated by one skilled in the art that changes to the first graphical component can result in the orientations of the first graphical component and one of the target orientations becoming "more similar" as the user continues to manipulate the first graphical object. In other implementations, some numeric components may be compared so as to categorize orientations as either similar (compatible) or dissimilar (not compatible) one to another. For example, two orientations that differ in scale or size in one or more dimensions may be determined to be dissimilar, and, accordingly such an implementation may exclude certain dissimilar target orientations as part of its process of selecting a first target orientation.

In an exemplary implementation, during a user manipulation of a first graphical object, the present invention applies supplemental display characteristics to the first graphical object to gradually change its orientation to become more similar to the selected target orientation. In one implementation, the present invention augments the user manipulation in such a way that the augmentation does not appear to conflict with the user's manipulation of the first graphical object.

For example, if the user is translating a graphical object using a single control point drag interaction, then the user manipulation is constraining changes to the position components (i.e., x and y coordinates) of the graphical object's orientation. In such a case, the supplemental display characteristics may affect rotation and scaling (as well as display characteristics such as color or transparency that are unrelated to orientation) without visibly conflicting with the user's translation manipulation. Changes to the position components of the orientation may be necessary to compensate for rotation or scaling to maintain a constant point of contact between the user's control point and the graphical object, but that the overall appearance is that the user is constraining the translation of the object.

It should be appreciated that in a 3D application, there are many more degrees of freedom in the spatial orientation of graphical objects, including x, y, and z position components, as well as scale, rotation, and skew about and along the multiple axes. This creates many opportunities for supplemental display characteristics that do not appear to conflict with user interactions.

FIG. 2A-2D shows a time series of snapshots of a user manipulation, wherein the user is manipulating a fraction circle, in the context of an electronic device with a display 130 and touch surface 131, using a single touch gesture and user manipulations are supplemented by rotating the fraction circle to an orientation more similar to a selected target orientation. The graphical objects in FIG. 2A-2D represent draggable fraction circle pieces in a 2D space, and the user manipulates them to build digital mathematical models of fractional numeric quantities. Building fraction circle models from sector-shaped fraction circle pieces requires both positioning and rotating fraction circle pieces into place, aligning the fraction circle piece being manipulated (i.e. the first graphical object 200) with previously positioned fraction circle pieces (i.e. graphical objects 205) to form a collection of adjoining fraction circle pieces (for simplicity, only one collection is illustrated in FIG. 2A-2D). The essence of fraction circle modeling establishes a plurality of target orientations 204 for the fraction circle 200 such that if the fraction circle 200 is dropped at any of the plurality of target orientations 204, it is joined to that collection. In this figure, the user interacts via a single-touch gesture 203 that defines the translation 201 of the fraction circle piece. A first target orientation 206 of the plurality of target orientations 204 is selected, because orientation 206 may be identified as being nearest to object 200 based on computed metrics for the different target orientations 204 as described above. Based on the selected target orientation 206, augmentation may include applying rotation 202 to the fraction circle piece 200 gradually over the course of the manipulation. After the user manipulation has ended, the software performs a final step of augmentation, fully aligning the fraction circle piece 200 to the selected target orientation by supplementing the position and rotation 207 of the fraction circle piece 200.

The application of the supplemental display characteristics is gradual in that the orientation of the fraction circle piece 200 is not changed to the orientation of the target orientation 206 and displayed in a single step. Rather, multiple intermediate orientations between the current orientation of the fraction circle piece 200 and the target orientation are computed and applied to the display of the fraction circle piece 200, with each succeeding intermediate orientation being more similar to the target orientation 206 than the previous intermediate orientation.

In this implementation, during single-point manipulation, the fraction circle piece 200 is rotated 202 at a natural rate of speed that would mimic a typical user's multi-touch rotation of the fraction circle 200 as the fraction circle would be moved to align with target orientation 206. In this implementation (but not shown in the figure), the user would alternatively be able to use a multi-touch gesture to position the fraction circle piece 200, and the multi-touch gesture would constrain both the translation and rotation of the fraction circle piece 200 such that augmentation might not be necessary. Regardless of whether the user employs a single or multi-touch gesture, and regardless of the device's capability for multi-point control, the disclosed processes allow the user to easily and efficiently construct a fraction circle model. The single-point manipulation illustrated in FIG. 2A-2D could have equivalently been enacted using any single-point pointing device, such as a mouse.

In some implementations, the process of determining a set of alternative target locations may be based in part on a physical model stored in the memory 102. Similarly, in some embodiments, the process of selecting a first target orientation may be based on a physical model stored in memory 102. Similarly, in some embodiments, the determining and gradually applying of the supplemental display characteristics may be based in part on a physical model stored in memory 102. In an exemplary implementation that includes a physical model, various graphical objects are each linked to a physical model in which the graphical objects are associated with properties such as density, mass, angular moments, coefficients of friction, and magnetic (or other attractive/repulsive) monopoles and dipoles at certain points on the modeled graphical objects. The properties may also be stored in memory 102. It should be appreciated that there are many ways to determine the alternative target locations, select a first target location, and/or determine and apply supplemental display characteristics based on such a model. Returning to FIG. 2A-2D, we describe possible implementations in which some of these steps are based on a physical model as described below. Those skilled in the art will understand how such physical models can be used to affect, in various implementations, aspects of determining of target orientations 204, the selecting a first target orientation 206, and the determining supplemental display characteristics of object 200, each concurrent with the movement of object 200.

Figure 2A:
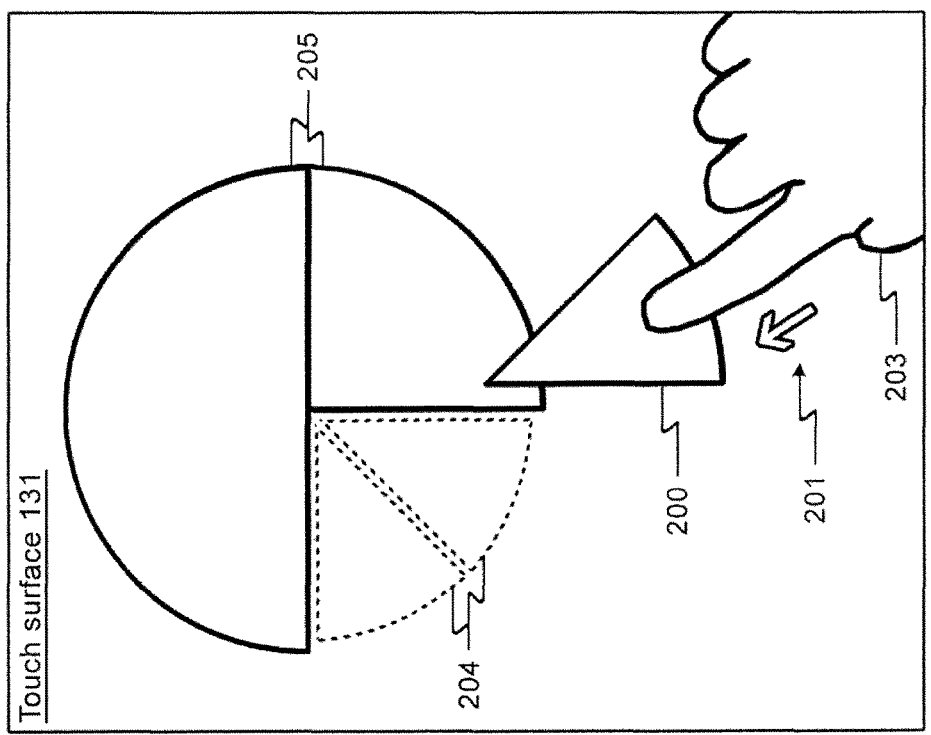
FIGS. 2A-2D are a time series of snapshots of a user manipulation event for modeling fraction circles.
Figure 2B:
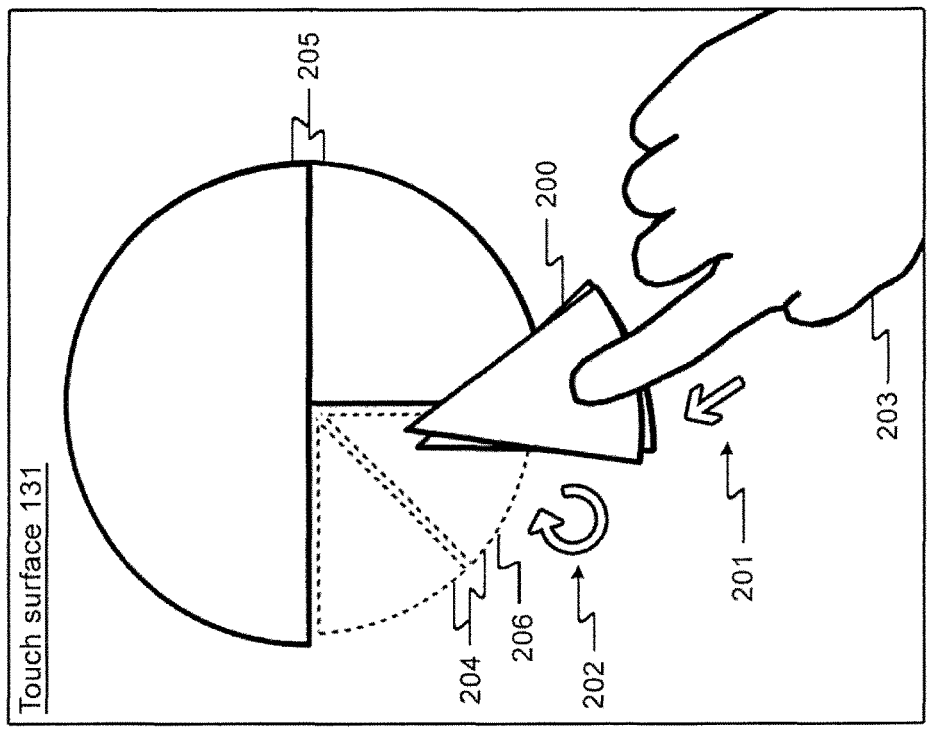
Figure 2C:
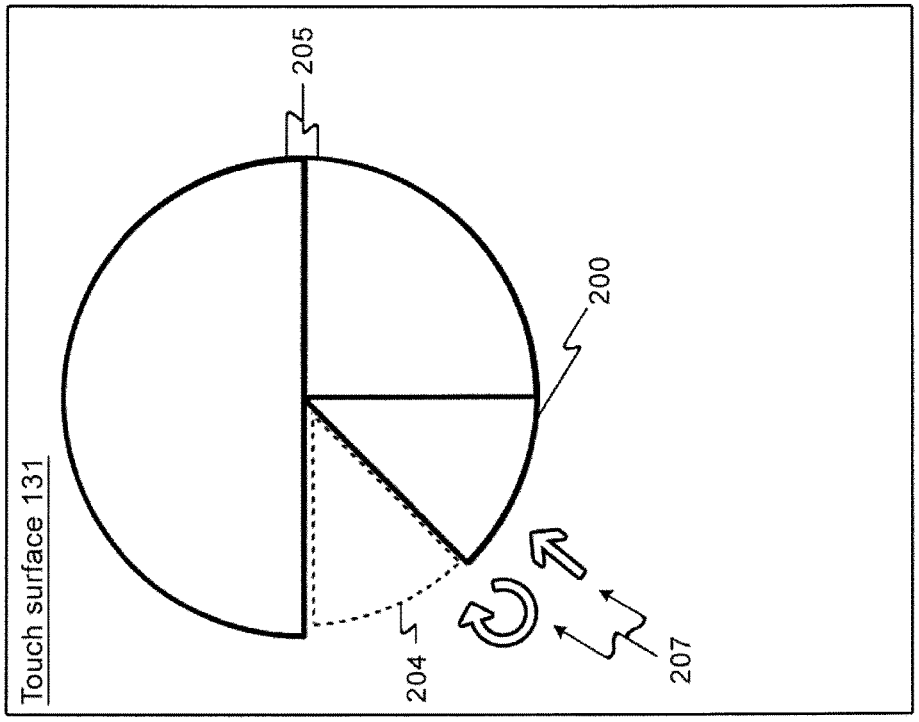
Figure 2D:
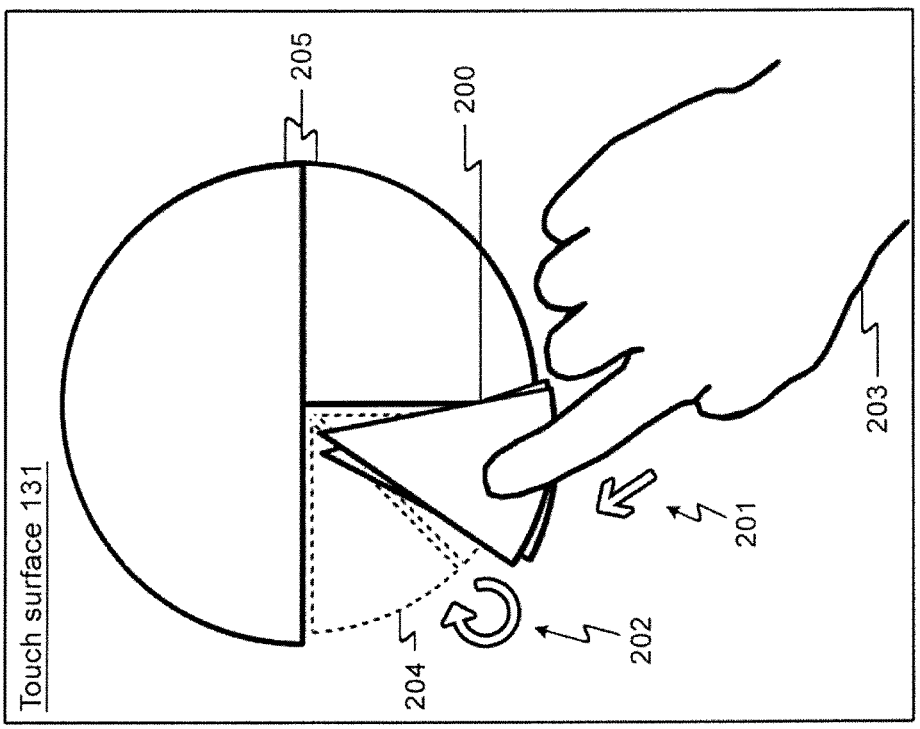

In FIG. 2A, the graphical objects 205 may be modeled as firmly attached to a two-dimensional surface parallel to touch surface 131 (i.e., so as to appear immovable during the user's manipulation of the first graphical object 200). The graphical object 200 and the graphical objects 205 may each be modeled as having certain magnetic monopoles or dipoles attached to them in fixed locations. For example, the model may include a magnetic monopole located at points along the illustrated radial line segments of the graphical objects 200 and 205 in FIG. 2A, or some other radial line segments inset from the illustrated segments by a fixed angle, and at a fixed radial distance from the point on which their arc-segment edges are centered. The physical model may assign a monopole of charge to the first graphical object 200 opposite from the charge assigned to each of the graphical objects 205. In this way, the graphical object 200 may appear to become attracted to the graphical objects 205 under the action of the physical model. The physical model associated with object 200 may also be given such properties as density, momentum, angular momentum, and coefficients of friction or drag. By additionally constraining the first graphical object 200 to have a point on the model fixed to coincide with the user's touch point, the action of the object 200 under the application of the physical model may therefore result in the rotation of object 200 about the touch point in a way that it appears as though graphical objects 205 attract object 200. The physical model may also include magnetic monopoles that are attached along the edges of the graphical objects 200 and 205 and polarized in such a way (e.g. with a magnetic north pole lying toward the radial center of the radial edges of the objects 205 shown in FIG. 2A, and similarly arranged but with reversed polarity on object 200 of FIG. 2A) that object 200 may appear to be attracted to the plurality of target orientations 204, and thus may behave as shown in FIG. 2B-2D. It should be understood that in this way, in some implementations, a physical model may be used to select the first of the plurality of target orientations 204. In other implementations, attributes may be added to the physical model in association with the plurality of target locations 204, e.g. by the placing of magnetic monopoles, dipoles, or other physical model properties at various points of each target location 204. Those skilled in the art will understand that the behavior of the first graphical object 200 may be determined in various ways from a physical model, including Hamiltonian mechanics and methods, Lagrangian mechanics and methods, methods of finite differences, methods of finite elements, etc., that are often used in the art to calculate the dynamics or characteristics of a physical model. It will also be understood that the augmentation of graphical object may thus be affected over time both while the user is manipulating the first graphical object 200 and continuing after the user releases the last touch point and ceases to manipulate the object 200, as illustrated in FIGS. 2C and 2D. It will also be understood that the determining the alternative target orientations 204 of the first object 200 and the selecting a first target orientation from the target orientations 204 may be determined in various ways from a physical model, including Hamiltonian mechanics, Lagrangian mechanics, fluid mechanics, methods of finite differences, methods of finite elements, etc., and the use of such methods and/or mechanics to determine the dynamics of a physical model, to determine certain model configurations that represent minimal or locally-minimal energy states, etc. Algorithms and procedures for the analysis and temporal evolution of physical models are well known in the art. Hamiltonian mechanics and methods of energy minimization, for example, may be used to determine target orientations 204 and select the first target orientation 206 in implementations with physical models that include potential and kinetic energy. Physical models that include momentum and/or angular momentum and/or friction and/or drag may be used in some preferred implementations to determine the supplemental display characteristics of object 200 in ways that feel intuitive or natural to users interacting with the system via device 100.

Turning now to FIG. 3, the illustrated example shows user interaction with a displayed graphical object using a single-point control 300 with a 3D application for digitally modeling spoke-and-hub architectures (similar to TinkerToys™ or molecular models). Spoke and hub models snap together in well-known ways, and as such, a plurality of target orientations 304 exist for a manipulation event of a first graphical object 301, in this case a 3D spoke. For simplicity, only a subset of all possible target orientations for the spoke 301 is shown in FIG. 3. In this example, the electronic device's display 130 is rendered as a 2D orthographic view of the 3D model. The user manipulates model pieces using a single-point control 300 on the 2D display. This implementation selects the nearest target orientation 304 to the spoke 301 by measuring the distance from the spoke to each target orientation 304 (at the point of mouse contact along the major axis of the spoke 301, and at a corresponding point on each target orientation). Gradually over the course of the user manipulation, as the spoke gets nearer to the selected target orientation, the orientation of the spoke 301 is augmented by making the spoke's orientation more similar to the selected target orientation in a succession of steps. This aligns the 3D spoke 301 with the selected 3D target orientation. This augmentation comprises multiple 3D rotation transformations, which would otherwise (i.e. without application of the disclosed methods) have required much more complex and sophisticated user input to achieve. As a result, regardless of whether the user employs a single or multi-touch gesture, and regardless of the device's capability for multi-point control, the user is easily and efficiently able to construct a 3D spoke and hub model.

In some implementations, while the user is manipulating the first graphical object 301, additional input from the user may be detected to inform the target selection algorithm and augmentation logic. In some implementations, such additional input may be a physical button, GUI button, voice command 503 (FIG. 5B), or accelerometer input, from an input/control device 150. In other implementations, such additional input may comprise detection of patterns of movement 510, 511 (FIG. 5A) in the control points of the pointing device, such as small rotations or erratic shaking of an input point. This additional input data may be used to select from among potentially ambiguous target orientations, or to alter the characteristics of the augmentation, as will be described in detail below.

In some implementations (such as the fraction circle modeling application illustrated in FIG. 2A-2D) a shaking motion 501 (FIG. 5A) indicates a sense of urgency or impatience by the user, especially young users. Many middle school students using the fraction circle modeling application were observed using a single-touch gesture and applying a shaking motion 501 to the fraction circle pieces without any instruction to do so while waiting for the augmentation to rotate the pieces into place. In one implementation, the software detects this shaking motion as erratic movement of the user input control point. In another implementation the device's accelerometer 142 data is used to detect a physical shaking motion. In one implementation, the present invention responds to the shaking motion by increasing the augmentation rate.

Figure 4A:
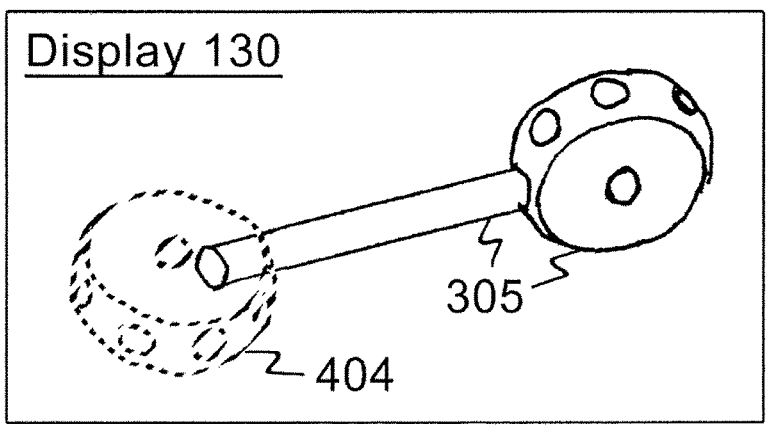
FIGS. 4A-4C are a set of three ambiguous target orientations for positioning a hub in a 3D spoke and hub modeling application, such that the target orientation cannot be fully derived from the user's 2D positional input.
Figure 4B:
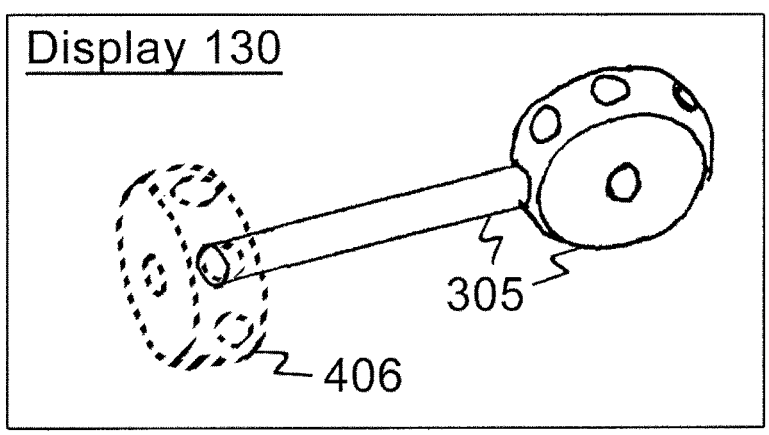
Figure 4C:
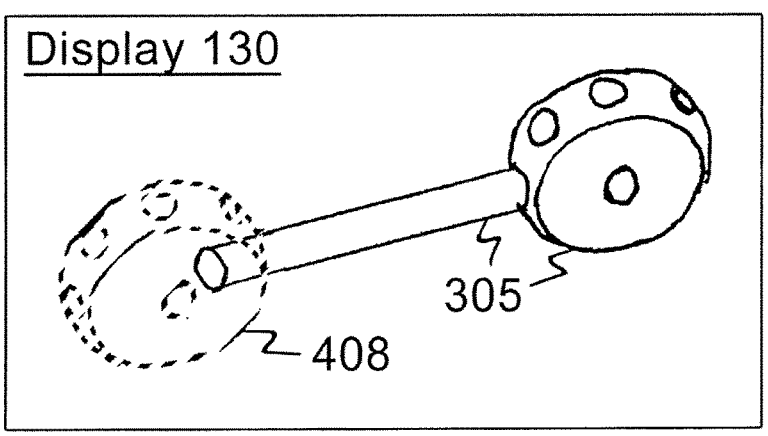
Figure 5A:
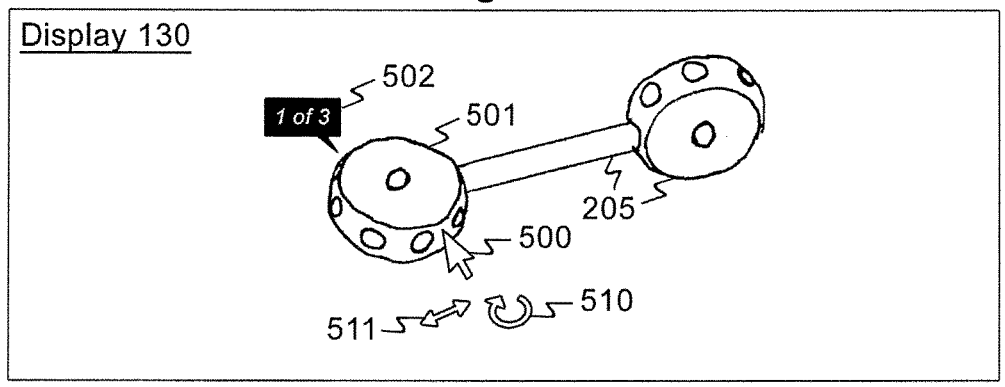
FIGS. 5A-5C are three exemplary embodiments of solving the target orientation ambiguities illustrated in FIG. 4A-4C.
Figure 5B:
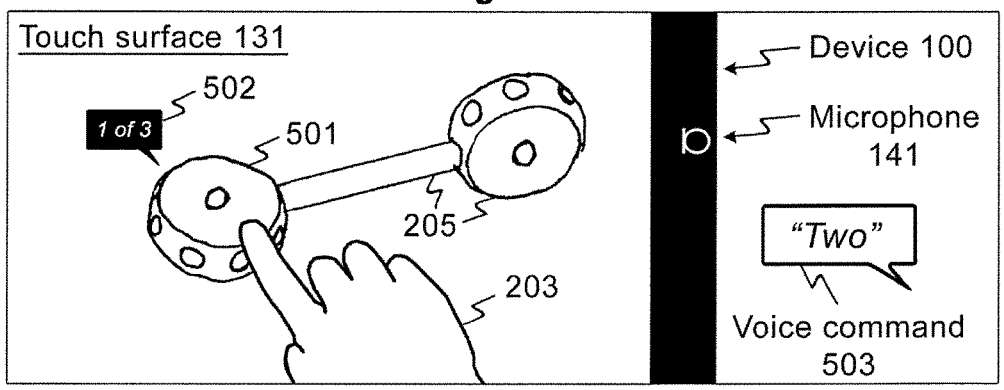
Figure 5C:
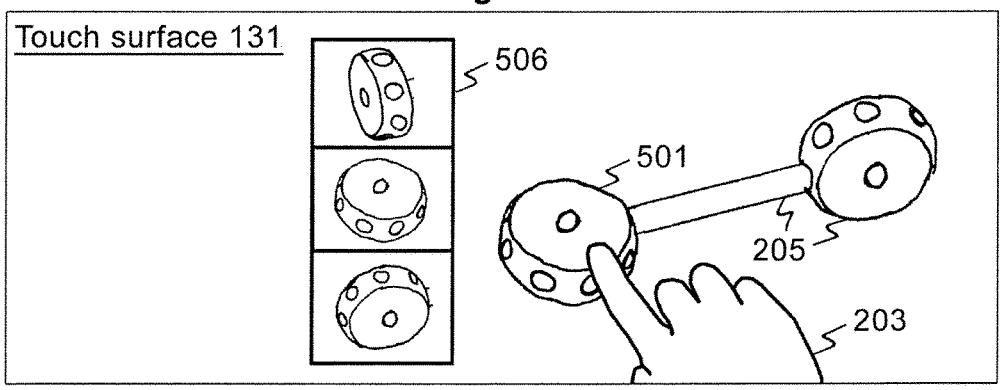

In some implementations, there may be multiple target orientations for a given manipulation event that are ambiguous; that is, the target orientations occupy very similar or largely overlapping regions on the display. One such case is illustrated in FIGS. 4A-4C, where the first graphical object is a hub (not shown) in a 3D spoke and hub model application. The three ambiguous target orientations 404, 406, and 408 are distinct in 3D space, but ambiguously occupy the same space when projected onto the 2D display 130 where user interaction occurs. Thus, a user's single-point 2D manipulation to position the hub is not enough information to accurately determine which target orientation represents the user's intent. Additional user input is required to select one of the target orientations 404, 406, or 408. FIGS. 5A-5C each illustrate a solution (i.e. a disambiguation method) to resolve the ambiguity.

In one implementation as shown in FIG. 5A, when the first graphical object 501—herein the hub being dragged by the user's single point control 500—is dragged into the vicinity of multiple ambiguous target orientations 404, 406, and 408 as shown in FIGS. 4A-4C, a visual indicator 502 (FIG. 5C) notifying the user of the ambiguity is displayed. In this implementation, the visual indicator 502 comprises a simple graphic element displaying an index number indicating which of the three target orientations 404, 406, and 408 is being targeted. In this implementation, the user applies a shaking motion 511 or a rotating motion 510 to the control point, and the system responds by cycling through index numbers of and displaying the alternative target orientations until the user discovers the intended target orientation. Similarly, if the user repeatedly drags, drops, re-drags, re-drops a given graphical object to the same target region, the system may respond by cycling through the ambiguous target orientations until the user discovers their intended target orientation.

In one implementation as shown in FIG. 5B, when the first graphical object 501—herein the hub being dragged by the user's single touch input 203—is dragged into the vicinity of multiple ambiguous target orientations 404, 406, and 408 as shown in FIGS. 4A-4C, a visual indicator 502 notifying the user of the ambiguity is displayed. In this implementation, the visual indicator 504 comprises a simple graphic element displaying an index number of the displayed one of the target orientations 404, 406, or 408. In this implementation, the user may use a voice command 503 such as "one", "two", or "three" to select a target orientation, or a voice command 503 such as "next" or "previous" to cycle through the target orientations. In one implementation, this voice command 503 is issued during the user manipulation event, while in another implementation, this voice command 503 is applied to a recently completed user manipulation event.

In one implementation as shown in FIG. 5C, when the first graphical object 501—herein the hub being dragged by the user's single touch input 203—is dragged into the vicinity of multiple ambiguous target orientations 404, 406, and 408 as shown in FIG. 4A-4C, the software displays a visual indicator 506 notifying the user of the ambiguity. In this implementation, the visual indicator 506 comprises depictions of the alternative target orientations. This visual indicator 506 is a touch-capable interface—each target orientation is displayed as a GUI button for selecting the target orientation. In one implementation, the depictions of the alternative target orientations may be a scrollable list. In one implementation, the visual indicator 506 is removed once the user 1) selects one of the depicted alternative target orientations, 2) drags the hub 501 away from the depicted alternative target orientations, or 3) interacts with a GUI element unrelated to the visual indicator 506. In one implementation, the user may interact with the visual indicator 506 during the manipulation event, while in another implementation; the user may interact with the visual indicator 502 after the manipulation event.

In one implementation, for the purpose of disambiguating a plurality of possible target orientations, a plurality of parameters may facilitate the disambiguation. The parameters may be adjustable by voice commands or other user input. In one implementation, such parameters are accompanied by a plurality of visual indicators (not shown), such that each visual indicator identifies an associated parameter name (e.g. "X-axis rotation" or "Spoke length"). In one implementation, voice commands 503 are prefixed with the parameter name to address said parameter. Example voice commands 503 could include "X-axis rotation 90 degrees" or "Spoke length 10 centimeters". In another implementation, other user inputs (e.g. physical buttons, accelerometer data, GUI controls, multi-touch gestures, etc.) are utilized to allow the user to set the disambiguation parameters. The exact set of parameters required to disambiguate target orientations is an application-dependent detail.

In some implementations, target orientations may exist that stretch or skew the user-manipulated graphical object.

In the case of the 3D spoke and hub model, the application could provide a spoke to the user that is variable in length. In terms of target orientations, this could be realized with a plurality of target orientations each with different lengths for the spoke.

In some implementations, the user may switch between single and multi-touch interactions during a single user manipulation. Augmentation may be adjusted based on the number of control points in use at any given time. In some implementations, certain augmentations may temporarily or permanently be disabled once the user demonstrates the ability to use multi-touch mode. In some implementations, past usage data may be stored to inform future augmentations.

Figure 6A:
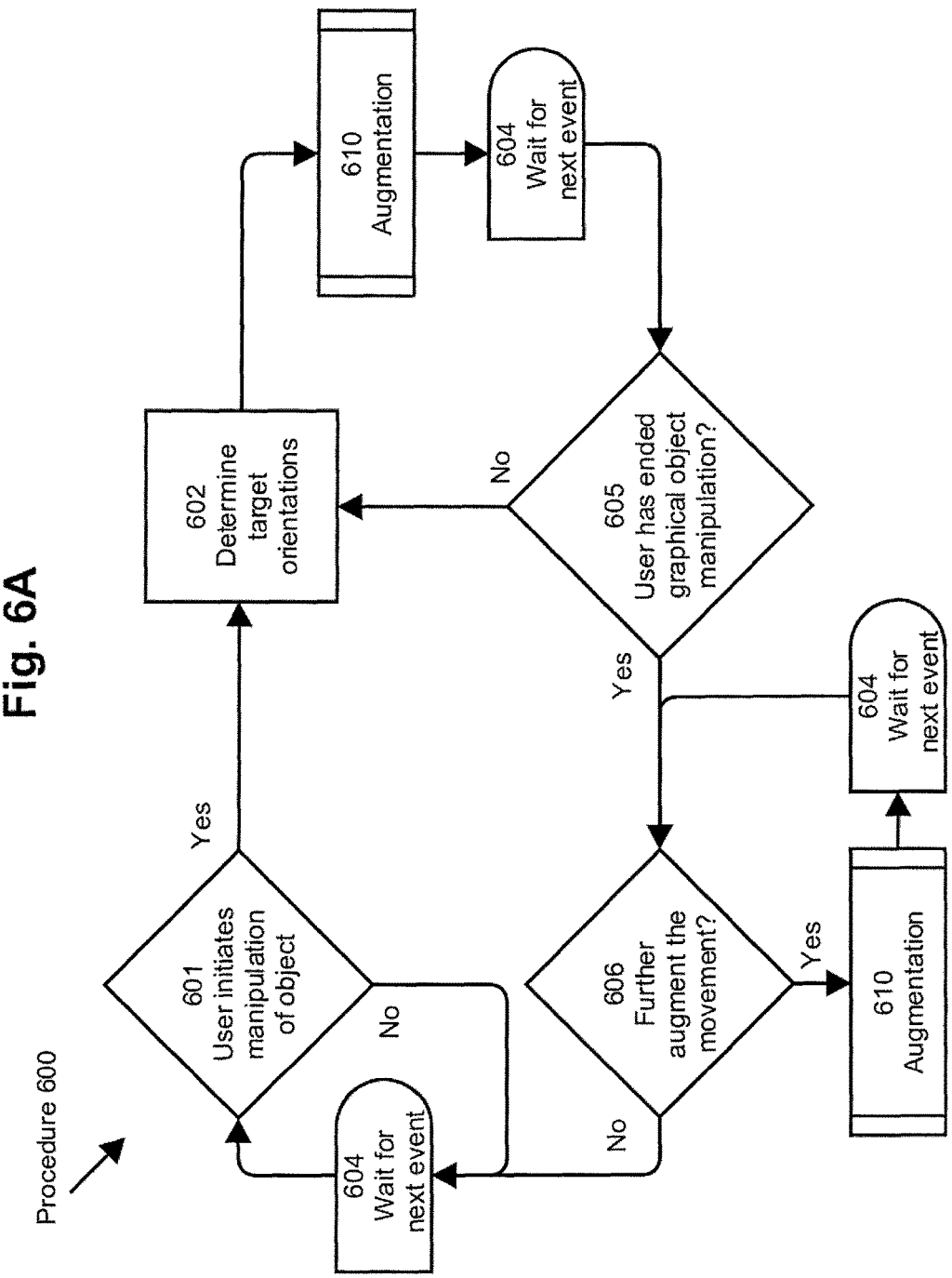
FIGS. 6A-6B are flow diagrams that describe an example process that implements the disclosed features for manipulating and displaying on an electronic device.
Figure 6B:
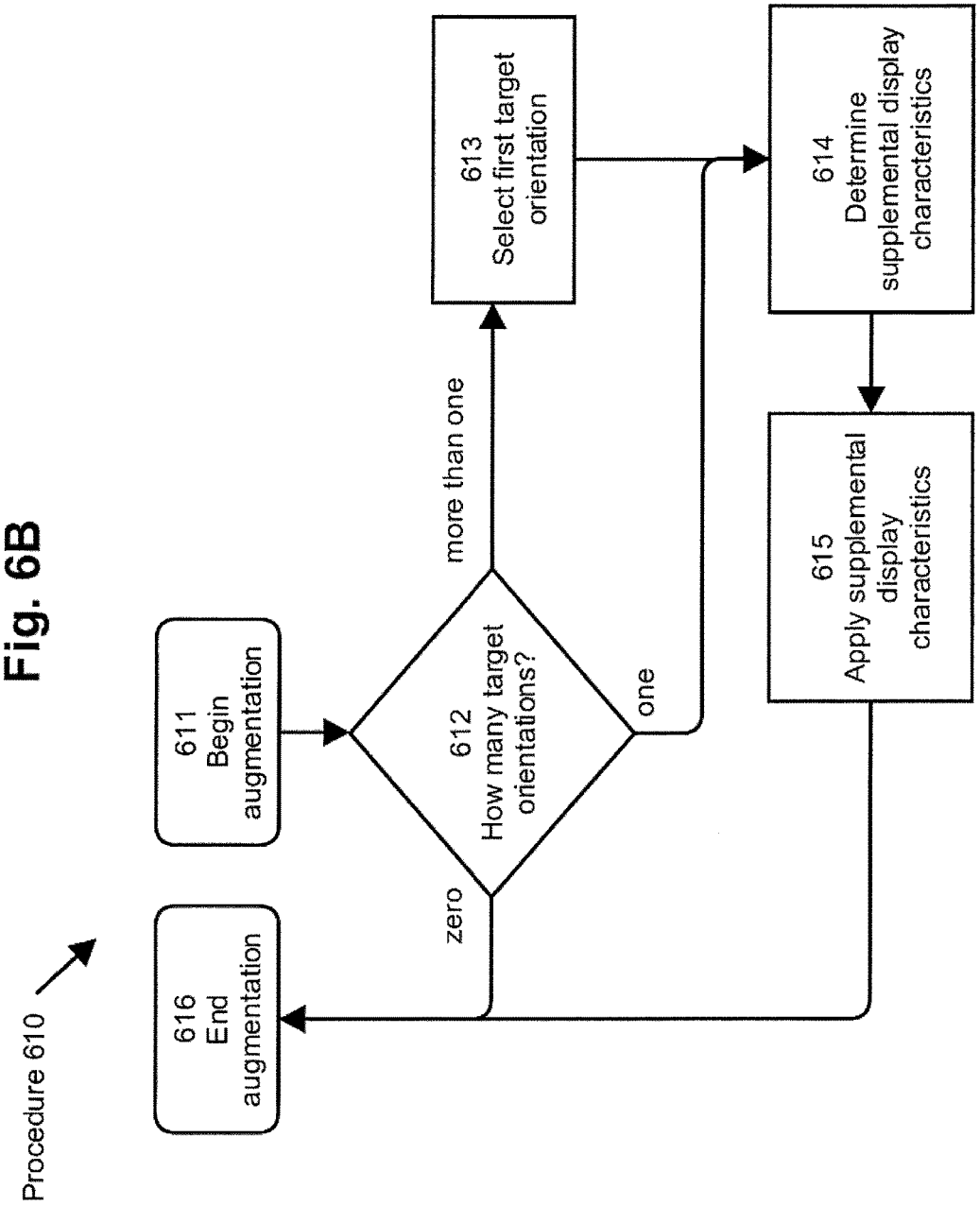

FIG. 6A is a flow diagram that describes an example process 600 of augmenting display characteristics of graphical objects manipulated by a user. In at least some implementations, the process 600 can be performed by a suitably configured computing device such as device 100. In particular, FIG. 6A and FIG. 6B describe an example process that can be used to detect the start of user manipulation of a first graphical object; to determine, concurrent with the movement of the first graphical object, a plurality of alternative target orientations; to select a first target orientation of the first graphical object; to determine supplemental display characteristics of the first graphical object, concurrent with the movement of object, based on orientation; to apply the determined supplemental display characteristics to the first graphical object, as the object is moved; to detect the end of user manipulation of the first graphical object; to determine additional supplemental display characteristics to apply to the first graphical object; and to apply the additional determined supplemental display characteristics to the first graphical object as the object continues to move after the end of user manipulation of the object. In the discussion of FIGS. 6A and 6B, reference may be made to the preceding Figures, which show example graphical objects to which one or more implementations may apply processes 600 and 610.

Step 601 determines whether the user has initiated a manipulation of a graphical object; if so, the manipulated graphical object becomes the first graphical object (e.g., FIG. 2A, #200) and the process proceeds to step 602; if not, process 600 proceeds to step 604 and waits for a next event (which in some implementations may be triggered by a timer which, further, may be a frame rate timer). Step 602 determines a plurality of target orientations for the first graphical object through a mechanism such as the algorithms described above, which may include as inputs the orientation and other characteristics of first graphical object, the orientations and other characteristics of other graphical objects (e.g., FIG. 2A, #205), and the history of past user interactions as sampled and recorded by process 600. In some implementations, step 601, step 604, and/or other steps of process 600 may record data (e.g., to Memory 102) that includes details about the nature and the timing of user interface events. In some implementations, step 602 may first determine a plurality of target orientations (e.g., FIG. 2A, #204) and then determine alternative target orientations which are a subset of these target orientations; for example, in a preferred implementation, step 602 may exclude target orientations that are inconsistent with certain user input constraints from the alternative target orientations. In implementations where step 602 determines such a subset of alternative target locations, it is to be understood that it is the subset of alternative target orientations that are passed to step 610 as the applicable target orientations for consideration at that step. In some preferred implementations on a device 100 that is multi-touch enabled, the exclusion of target orientations that are inconsistent with certain user input constraints, it is desirable for step 602 to determine and pass to step 610 a subset of target orientations for consideration, with the determined subset excluding those target orientations that are determined to be inconsistent with the user input constraints.

Step 610 is a sub-process such as the example process shown in FIG. 6B that can be used to select a first target orientation (e.g., FIG. 2B, #206) of the first graphical object; to determine supplemental display characteristics of the first graphical object based on the selected orientation; and to apply the determined supplemental display characteristics to the first graphical object; each iteration of sub-procedure 610 being done concurrent with the movement of the first graphical object.

Step 604 following step/sub-process 610 allows the process to wait for an event such as a next user interface event or display frame-rate timer event, as will be understood by those skilled in the art as typical of user interface systems. Step 605 determines whether the user has ended their manipulation of the first graphical object. On a device 100 that supports multi-touch, Step 605 may determine that the manipulation has ended in response to the user input indicating zero control points, as will be understood by those skilled in the art as a typical usage pattern on such systems, and, moreover, equally applicable to a device 100 that supports only a single control point as specified by a pointing device such as mouse 133. If the user manipulation of the first graphical object has ended, the procedure proceeds to step 606, otherwise the procedure returns to step 602.

Step 606 determines whether further augmentation should be applied to the first graphical object 200. For example, in some implementations, after the user has ended manipulation of graphical object 200, the software may continue to augment the graphical object by determining new supplemental display characteristics and applying them at step 610 over a sequence of time intervals governed by step 604, thereby continuing the apparent motion of graphical object 200 until its orientation matches the selected first target orientation 206, at which time step 606 may determine that no further augmentation will be applied.

In some implementations, the steps of procedure 600 may reference and update a physical model in which graphical objects 200, 205, etc., are further represented as having certain physical characteristics, e.g., as described above in reference to FIGS. 2A-2D. In such cases, preferred implementations will often include a damping component, such as friction, so that as procedure 600 iterates through steps 610 and 604, at each iteration the amount by which the applying of the supplemental display characteristics of object 200 are augmented may be reduced relative to previous iterations. This may be an especially important consideration following the determination at step 605 that the user has ended their interactive manipulation of graphical object 200. As will be understood by those skilled in the art, if the procedure 600 imposes an attraction (e.g., via attractive force(s) in the physical model) between object 200 and the first selected target orientation 206, then object 200 may move toward the selected orientation 206, but, in the absence of a dampening factor (e.g. without the inclusion of a component of friction or drag in the physical model) object 200 may orbit or otherwise oscillate around orientation 206 without ever coming to rest (i.e., without the supplemental display characteristics of object 200 every converging to the desired supplemental display characteristics, or to any stable and fixed vector of supplemental display characteristics).

FIG. 6B is a flow diagram that describes an example sub-process 610 augmenting the display characteristics of a graphical object. Process 610 determines and applies an augmentation process to the first graphical object (e.g., FIG. 2A, #200), a process partially described in the broader context of process 600, above. Process 610 is entered at step 611, the point to which control is passed from process 600. Step 612 examines the number of possible alternative target orientations (e.g., FIG. 2A, #204). If there are no alternative target orientations, process 610 continues to step 616 where the augmentation process stops. If there is exactly one target orientation, process 610 continues to step 614, otherwise, i.e., if there is more than one target orientation, process 610 continues to step 613. Step 613 selects a first target orientation (e.g., FIG. 2B, #206) from the alternative target orientations (e.g., FIG. 2A, #204). Various implementations of step 613 may use the various mechanisms for the selection of a first target orientation as described above. Step 614 determines the supplemental display characteristics that should be applied to the first graphical object, given its current characteristics, the characteristics of the first target orientation, and the characteristics of other graphical objects (e.g., FIG. 2B, #205). Various implementations of step 614 may use the various mechanisms for the determination of supplemental display characteristics of the first graphical object as described above. Step 615 applies the supplemental display characteristics that were determined by step 614 to the first graphical object. The result of step 615 may be to cause the first graphical object to appear incrementally more similar to the first target orientation. Step 616 returns control to process 600 that had passed control to process 610.

What has been described above includes examples of different implementations of various aspects of the present invention. It is, of course, not possible to describe every conceivable combination of components or methodologies that might be suitable, but one of ordinary skill in the art may recognize that many further combinations and permutations of the disclosed implementations are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While there have been shown and described and pointed out certain novel features of the present invention, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps that perform substantially the same function in substantially the same way to achieve the same results are within the scope of the invention. Substitutions of method steps and elements from one described embodiment or implementation to another are also fully intended and contemplated. It is the intention, therefore, to be limited only as indicated by the scope of the claims appended hereto.

We claim:

1. A method of displaying objects, comprising:
    displaying movement of a first object on a display device in response to user input from a pointing device to a processor that outputs to the display device, display characteristics of the first object;
    determining, by the processor, concurrent with the movement of the first object and the pointing device positioned over the first object, a plurality of alternative target orientations of the first object based at least in part on how the first object fits together with and dimensions of at least one other displayed object;
    selecting, by the processor, a first target orientation from the plurality of alternative target orientations;
    determining, by the processor, supplemental display characteristics of the first object based on the first target orientation and concurrent with the movement of the first object, wherein the determining the supplemental display characteristics includes determining a plurality of intermediate orientations based on a current orientation of the first object and the first target orientation; and
    applying, by the processor, the supplemental display characteristics including incrementally adjusting the current orientation of the first object toward the first target orientation concurrently with movement of the first object displayed on the display device as the first object and the pointing device are moved towards the first target orientation, wherein incrementally adjusting the current orientation includes rotating the first object according to the plurality of intermediate orientations.

2. The method of claim 1, wherein the determining the alternative target orientations includes determining the alternative target orientations based on a physical model stored in a memory and the physical model includes at least one physical property of the first object and at least one physical property of at least one other displayed object.

3. The method of claim 2, wherein the selecting a first target orientation is in part based on the physical model.

4. The method of claim 1, wherein the selecting the first target orientation includes calculating the difference between each target orientation and the first object's current orientation, and selecting as the first target orientation the target orientation having a minimal difference from the first object's current orientation.

5. The method of claim 4, wherein the determining the supplemental display characteristics includes determining supplemental display characteristics that reduce a difference between a current orientation of the first object and the first target orientation.

6. The method of claim 1, wherein the determining the supplemental display characteristics includes determining an amount to rotate the first object.

7. The method of claim 1, wherein the determining the supplemental display characteristics includes determining an amount to scale the first object.

8. The method of claim 1, wherein the determining the supplemental display characteristics is in part based on dynamics of a physical model of at least one of kinetic energy, momentum, or angular momentum.

9. The method of claim 8, further comprising:
    in response to the user input indicating zero control points, continuing the applying the supplemental display characteristics based on the dynamics of the physical model; and
    continuing the determining of the alternative target orientations, the selecting of the first target orientation, and the determining the supplemental display characteristics.

10. The method of claim 9, wherein said physical model further includes a damping component such as friction by which the applying the supplemental display characteristics will terminate in finite time.

11. The method of claim 1, further comprising:
in response to the user input indicating zero control points, continuing the applying the supplemental display characteristics until the first graphical object is aligned to the first target orientation.

12. The method of claim 1, further comprising:
performing the determining of alternative target orientations, selecting a first target orientation, determining supplemental display characteristics, and applying the supplemental display characteristics in response to the user input indicating a single control point; and
in response to the user input indicating two or more control points:
  determining, concurrent with the movement of the first object, a subset of alternative target orientations from the plurality of alternative target orientations of the first object, wherein the subset of alternative target orientations excludes all target orientations that are incompatible with the user input indicating two or more control points;
  if the subset is empty, ceasing the applying the supplemental display characteristics; and
  if the subset is not empty, selecting a second target orientation from the subset of alternative target orientations, determining supplemental display characteristics of the first object based on the second target orientation and concurrent with the movement of the first object, and applying the supplemental display characteristics to the displayed movement as the first object is moved.

13. The method of claim 1, wherein the applying the supplement display characteristics includes:
determining a plurality of intermediate orientations between a current orientation of the first object and the first target orientation; and
applying the intermediate orientations in succession to the displayed movement of the first object, wherein each succeeding intermediate orientation is more similar to the first target orientation than a previously applied intermediate orientation.

14. A system for augmenting display of graphical objects, comprising:
a processor;
a memory coupled to the processor; and
a display device coupled to the processor;
wherein the memory is configured with instructions that when executed by the processor cause the processor to perform the operations including:
  displaying movement of a first object on a display device in response to user input from a pointing device to a processor that outputs to the display device, display characteristics of the first object;
  determining concurrent with the movement of the first object and the pointing device positioned over the first object, a plurality of alternative target orientations of the first object based at least in part on how the first object fits together with and dimensions of at least one other displayed object;
  selecting a first target orientation from the plurality of alternative target orientations;
  determining supplemental display characteristics of the first object based on the first target orientation and concurrent with the movement of the first object, wherein the determining the supplemental display characteristics includes determining a plurality of intermediate orientations based on a current orientation of the first object and the first target orientation; and
  applying the supplemental display characteristics including incrementally adjusting the current orientation of the first object toward the first target orientation concurrently with movement of the first object displayed on the display device as the first object and the pointing device are moved towards the first target orientation, wherein incrementally adjusting the current orientation includes rotating the first object according to the plurality of intermediate orientations.

15. The system of claim 14, wherein the instructions for determining the alternative target orientations include instructions for determining the alternative target orientations based on a physical model stored in a memory and the physical model includes at least one physical property of the first object and at least one physical property of at least one other displayed object.

16. The system of claim 15, wherein the selecting a first target orientation is in part based on the physical model.

17. The system of claim 14, wherein the instructions for selecting the first target orientation include instructions for calculating the difference between each target orientation and the first object's current orientation, and instructions for selecting as the first target orientation the target orientation having a minimal difference from the first object's current orientation.

18. The system of claim 17, wherein the instructions for determining the supplemental display characteristics include instructions for determining supplemental display characteristics that reduce a difference between a current orientation of the first object and the first target orientation.

19. The system of claim 14, wherein the instructions for determining the supplemental display characteristics include instructions for determining an amount to rotate the first object.

20. The system of claim 14, wherein the instructions for determining the supplemental display characteristics include instructions for determining an amount to scale the first object.

21. The system of claim 14, wherein the determining the supplemental display characteristics is in part based on dynamics of a physical model of at least one of kinetic energy, momentum, or angular momentum.

22. The system of claim 21, wherein the memory is further configured with instructions that when executed by the processor cause the processor to perform operations including:
in response to the user input indicating zero control points, continuing the applying the supplemental display characteristics based on the dynamics of the physical model; and
continuing the determining of the alternative target orientations, the selecting of the first target orientation, and the determining the supplemental display characteristics.

23. The system of claim 22, wherein said physical model further includes a damping component such as friction by which the applying the supplemental display characteristics will terminate in finite time.

24. The system of claim 14, wherein the memory is further configured with instructions that when executed by the processor cause the processor to perform operations including:
   in response to the user input indicating zero control points, continuing the applying the supplemental display characteristics until the first graphical object is aligned to the first target orientation.

25. The system of claim 14, wherein the memory is further configured with instructions that when executed by the processor cause the processor to perform operations including:
   performing the determining of alternative target orientations, selecting a first target orientation, determining supplemental display characteristics, and applying the supplemental display characteristics in response to the user input indicating a single control point; and
   in response to the user input indicating two or more control points:
      determining, concurrent with the movement of the first object, a subset of alternative target orientations from the plurality of alternative target orientations of the first object, wherein the subset of alternative target orientations excludes all target orientations that are incompatible with the user input indicating two or more control points;
      if the subset is empty, ceasing the applying the supplemental display characteristics; and
      if the subset is not empty, selecting a second target orientation from the subset of alternative target orientations, determining supplemental display characteristics of the first object based on the second target orientation and concurrent with the movement of the first object, and applying the supplemental display characteristics to the displayed movement as the first object is moved.

26. The system of claim 14, wherein the instructions for applying the supplement display characteristics include instructions for:
   determining a plurality of intermediate orientations between a current orientation of the first object and the first target orientation; and
   applying the intermediate orientations in succession to the displayed movement of the first object, wherein each succeeding intermediate orientation is more similar to the first target orientation than a previously applied intermediate orientation.

* * * * *